UNITED STATES PATENT OFFICE.

CHARLES E. POPE, OF PITTSBURG, PENNSYLVANIA.

CEMENT-SILICA BRICK FOR METALLURGICAL AND OTHER USES.

944,694.

Specification of Letters Patent.

Patented Dec. 28, 1909.

No Drawing. Application filed September 17, 1908. Serial No. 453,498.

*To all whom it may concern:*

Be it known that I, CHARLES E. POPE, a citizen of the United States, residing at Pittsburg, Pennsylvania, have invented certain new and useful Improvements in Cement-Silica Brick for Metallurgical and other Uses, of which the following is a specification.

The object of the invention is to produce a brick of highly refractory character in respect to heat, friction, and chemical agencies for use in basic open-hearth furnaces and in many other furnaces, flues, and the like.

The brick which forms the subject-matter of the present application is composed of particles of silica brick and of unground cement clinker nodules, preferably broken, and a bond of Portland cement.

Owing to the higher heats and increased friction which are now common, many of the types of silica bricks, flint clay bricks, and other fire bricks which were formerly adequate for their respective intended uses are no longer able to satisfactorily stand the high heats and the friction combined with the chemical attack of the gases, slags, and other agencies to which they are subjected not only in open-hearth furnaces and other metallurgical furnaces, but also in many flues, furnaces, and various other places where materials highly refractory not only to heat, but to friction and attendant agencies are required. The shrinkage in materials composed largely of alumina and the expansion and contraction in compositions largely of silica, add to the great difficulties of producing satisfactory brick for such uses.

Unground cement clinker nodules, preferably broken into fragments so as to present angular edges, and broken silica brick bats, or burnt silica brick fragments bonded together with sufficient Portland cement, make an excellent, economical, and highly refractory brick which, while readily withstanding high temperatures, is also highly resistant to the wear and tear due to excessive friction. Such a brick can, for example, be satisfactorily used under prevailing conditions in place of silica brick in basic open-hearth furnaces. The intimate union between the Portland cement and the cement clinker nodules and silica brick fragments produces a very desirable composite brick.

In preparing the improved brick I prefer to take the cement clinker nodules just as they come from the rotary kiln and crush or break the larger masses into jagged form, making sharp fragments. I prefer also to sort the different sizes of fragments, including smaller unbroken nodules, into two sizes, the larger of which will not pass through a mesh having one-eighth inch openings. I also take broken silica bats, or if desired specially made fragmentary pieces of burnt silica brick materials sorted into two sizes corresponding with the two sizes of broken nodules, after breaking them or otherwise reducing them to suitable sizes by means of rolls or in any other suitable way. I mix approximately three parts of the coarser and three parts of the finer of each of these two materials and then bond the whole twelve parts together with two parts of finished Portland cement, with the usual added percentage of water, forming and molding the brick in the desired forms, and then allowing it to set. The same composition may be used for repairing or making linings while it is in the plastic condition, as will be well understood. The percentages given may be varied according to the variations in sizes of the bats and cement clinker fragments, following principles well understood in making concretes. The proportions I have stated are those which are very satisfactory under average conditions.

This composite brick combines with its highly refractory qualities the advantage of expanding, when subjected to high temperatures, very much less than silica brick.

What I claim and desire to secure by Patent is:

1. Refractory brick composed of approximately three parts coarse cement clinker nodules, three parts relatively fine nodules, three parts coarse silica brick, three parts fine silica brick, and a bond of two parts Portland cement.

2. Refractory brick composed of approximately equal parts of cement clinker nodules and silica brick bonded together with Portland cement.

3. Refractory brick comprising sharp broken cement clinker nodules and silica brick fragments bonded with Portland cement.

4. Refractory brick comprising cement clinker nodules and silica brick bonded with Portland cement.

In testimony whereof I have signed this specification in the presence of two subscribing witnesses.

CHARLES E. POPE.

Witnesses:
JAMES S. DOUTHITT,
WM. F. BILLINGER, Jr.